(No Model.)
F. G. SARGENT.
DUCKER FOR WOOL WASHING MACHINES.
No. 605,653. Patented June 14, 1898.
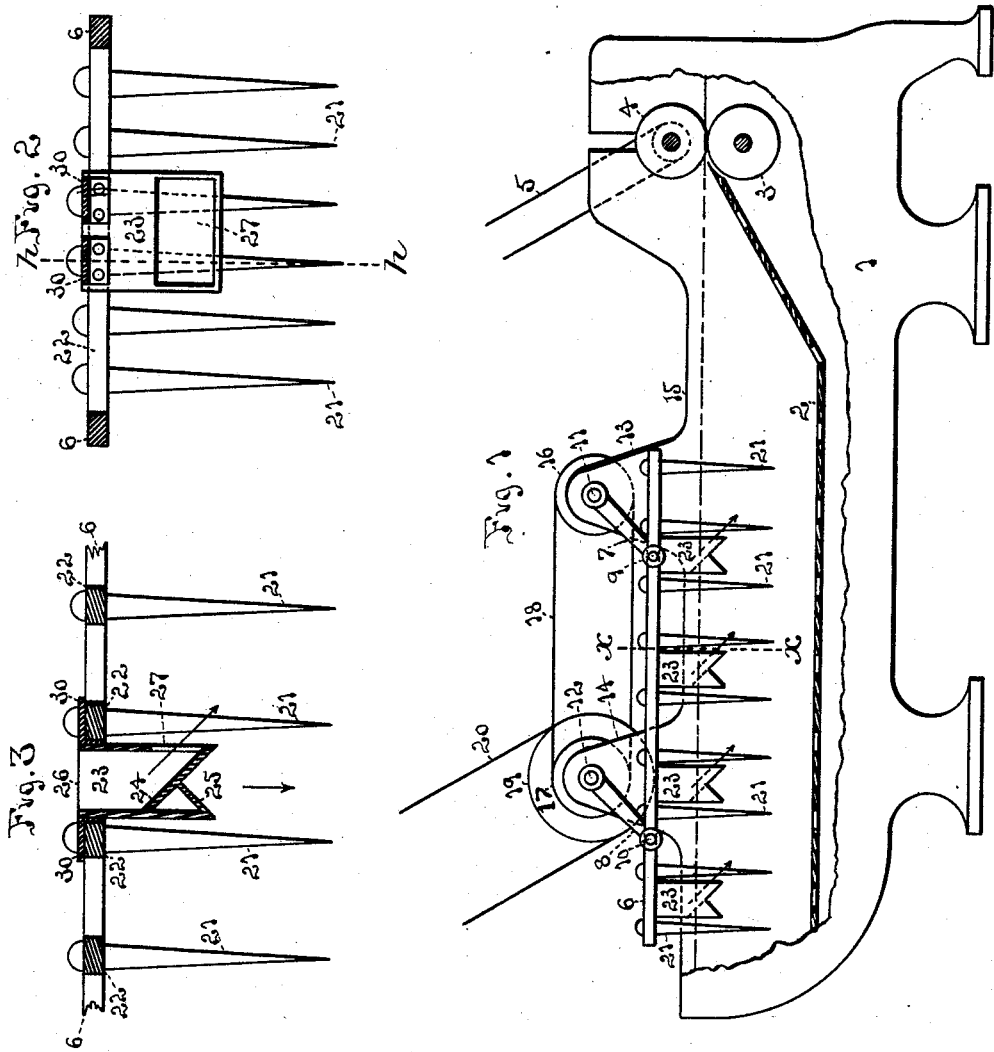
Witnesses
Wm. S. Brown
N. P. Ockington
Inventor
Frederick G. Sargent
by his attorney
Lepine Hall Rice

UNITED STATES PATENT OFFICE.

FREDERICK G. SARGENT, OF GRANITEVILLE, MASSACHUSETTS.

DUCKER FOR WOOL-WASHING MACHINES.

SPECIFICATION forming part of Letters Patent No. 605,653, dated June 14, 1898.

Application filed March 26, 1896. Serial No. 585,027. (No model.)

*To all whom it may concern:*

Be it known that I, FREDERICK G. SARGENT, of Graniteville, in the county of Middlesex and Commonwealth of Massachusetts, have invented a new and useful Ducker for Wool-Washing Machines, of which the following, taken in connection with the accompanying drawings, is a specification.

The form in which I prefer to embody my invention is that shown in the drawings, in which—

Figure 1 is a side elevation of a wool-washing machine equipped with my ducker, the side of the bowl being broken away to disclose the arrangement of the duckers upon the harrow. Fig. 2 is a transverse vertical section on the line $xx$ of Fig. 1, omitting everything but the harrow and ducker. Fig. 3 is a longitudinal vertical section on the line $yy$ of Fig. 2.

I will first briefly describe the old and well-known machine to which my ducker is intended to be attached.

The bowl 1 has a false bottom 2, which is inclined at the forward end up to the wringer-rolls 3 4. These are driven from any counter-shaft by the belt 5. In the body of the bowl is hung a harrow 6 by two cranks 7 8, whose wrists 9 10 are journaled thereto and whose shafts 11 12 are carried in standards 13 14, rising from the side 15 of the bowl. The shafts bear on their outer ends equal pulleys 16 17, connected by a belt 18. On one shaft, it is immaterial on which, is fixed another pulley 19, leading to any counter-shaft. Thus each point of the harrow is given a rotary motion, while the harrow as a whole remains horizontal. The harrow consists of a frame bearing rows of down-pointing teeth 21, which loosen up and carry forward the masses of wool.

In order more completely to subject the wool to the cleansing action of the liquid, "duckers" have been commonly employed, either attached to the harrow or working independently, their function varying with their construction. Some consist of forks, teeth, plates, and the like, designed simply to immerse the wool, or also to carry it forward at the same time. Such, indeed, is the function of the harrow itself. Others have possessed a netted or perforated structure, which allows free passage to the liquid as the ducker moves through it, but immerses the wool. In this case the wool is additionally cleansed by the innumerable small streams of liquid that pass the perforations while the masses of wool are held against them by pressure. My ducker, on the contrary, consists of a closed receptacle or box with a definite outlet, so proportioned that when the box has been immersed and is filled with liquid its withdrawal from the bowl of the washer will create a gushing stream through said outlet. I find that such a stream sets up a peculiar wave motion throughout the liquid, which, combined with the immersion produced by the descent of the box and the cleansing effect of the stream itself, results in a very superior washing of the wool, and while I prefer to use only one outlet for each ducker and to place that in front, so as to drive forward the wool to the next ducker, I do not limit the scope of my invention to such specific arrangement. Figs. 2 and 3 of the drawings show the ducker so arranged and with the two additional features of a forward pitch to the interior bottom to aid in directing the discharge and a reëntrant angle in the exterior bottom to prevent the liquid displaced by the descent of the box from being forced back rather than forward, producing instead a vertical displacement, as shown by the arrow.

23 is the box, which is open at the top 26 and at the lower part of the front 27. The top opening, however, will be always above the water-line, (shown by dashes in Fig. 1,) the liquid and floating fiber rushing in and out by the front outlet. 24 is the inclined bottom, and 25 is the bottom piece forming the reëntrant angle. The ducker is attached to the cross-bars 22 of the harrow-frame by angle-irons 30. Thus the ducker is of the simplest construction and has no moving or wearing parts, while it perfectly performs all the functions as set forth above.

What I claim as new and of my invention is—

The ducker-box 23 having the outlet 27 and inclined bottom 24, with oppositely-inclined bottom piece 25.

FREDERICK G. SARGENT.

Witnesses:
A. B. MCGOWN,
MARY H. SARGENT.